(12) United States Patent
Jerebko et al.

(10) Patent No.: US 9,275,478 B2
(45) Date of Patent: Mar. 1, 2016

(54) METHOD, CONTROL SYSTEM, AND COMPUTER PROGRAM FOR COMPRESSION OF DIGITAL BREAST TOMOSYNTHESIS DATA

(71) Applicant: SIEMENS AKTIENGESELLSCHAFT, Munich (DE)

(72) Inventors: Anna Jerebko, Hausen (DE); Eva Rumpel, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 60 days.

(21) Appl. No.: 13/958,780

(22) Filed: Aug. 5, 2013

(65) Prior Publication Data
US 2015/0036904 A1     Feb. 5, 2015

(51) Int. Cl.
*G06K 9/00*     (2006.01)
*G06T 11/00*     (2006.01)

(52) U.S. Cl.
CPC ......... G06T 11/005 (2013.01); *G06T 2211/436* (2013.01)

(58) Field of Classification Search
None
See application file for complete search history.

(56) References Cited

U.S. PATENT DOCUMENTS

2011/0085718 A1*   4/2011   Ingerman et al. ............. 382/131

OTHER PUBLICATIONS

Kai Zeng, Digital Tomosynthesis Aided by Low-Resolution Exact Computed Tomography, 2007, Computer Assisted Tomography, vol. 31, No. 6, pp. 976-983.*
Zeng et al, Digital Tomosynthesis Aided by Low-Resolution Exact Computed Tomography, 2007, Journal Computer Assist Tomography, 31:976-983.*
Various authors, Excerpt from Wikipedia.com, http://en.wikipedia.org/wiki/X-ray_computed_tomography.
Mertelmeier, T., et al., "Optimizing filtered backprojection reconstruction for a breast tomosynthesis prototype device" Proceedings of SPIE, 6142, Medical Imaging 2006: Physics of Medical Imaging, 61420F (Mar. 2, 2006); doi:10.1117/12.651380.
Bissonnette, M., et al., "Digital breast tomosynthesis using an amorphous selenium flat panel detector" Proceedings of SPIE, 5745, Medical Imaging 2005: Physics of Medical Imaging, 529 (Aug. 30, 2005); doi:10.1117/12.601622.

* cited by examiner

*Primary Examiner* — Chan Park
*Assistant Examiner* — Mai Tran
(74) *Attorney, Agent, or Firm* — Laurence Greenberg; Werner Stemer; Ralph Locher

(57) ABSTRACT

A method for compressing digital breast tomosynthesis data, a system and a control unit for image reconstruction of three-dimensional digital breast tomosynthesis volumes (DBT). The volume to be reconstructed is analyzed in order to identify clusters of regions in the volume with a low and high degree of diagnostically relevant information. Depending on the affiliation or belonging to a certain cluster, a specific reconstruction algorithm and a specific slab thickness are determined in order to be used for reconstruction of the cluster. Thus, different clusters are reconstructed differently.

8 Claims, 2 Drawing Sheets

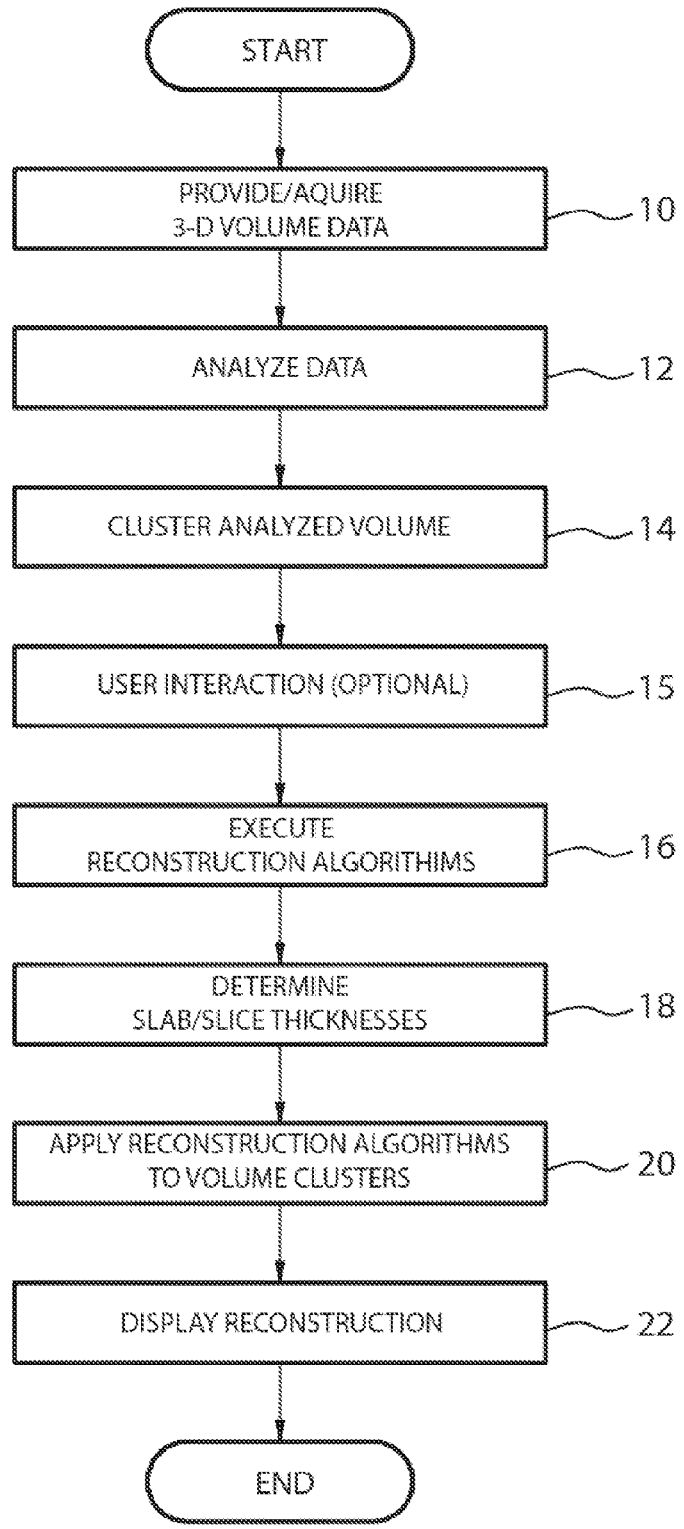

METHOD, CONTROL SYSTEM, AND COMPUTER PROGRAM FOR COMPRESSION OF DIGITAL BREAST TOMOSYNTHESIS DATA

FIELD OF TECHNOLOGY

The present invention, generally, refers to the reduction of the data volume to be processed for image reconstruction of a three-dimensional digital breast tomosynthesis volume (DBT). Particularly, the present invention relates to an image reconstruction method, which identifies diagnostically relevant image information and processes this kind of information separately for image reconstruction. Thus, the field of technology relates to breast cancer detection and computer science as well.

BACKGROUND OF THE INVENTION

Digital breast tomosynthesis volumes provide more information than regular full field digital mammography (FFDM—Full Field Digital Mammography) images for early detection of abnormalities and cancer. Unfortunately, the reading time and therefore the cost of examination increases more than two-fold with digital breast tomosynthesis imaging compared to FFDM methods.

In conventional projection mammography it is possible that certain anatomical structures (for example calcium deposits or certain opacities) are not spotted or represented on the respective image, because superimposed structures disturb the visibility of underlying structures of the breast and in the end may lead to a falsely positive interpretation of the image.

In order to overcome the limitations of conventional mammography, digital breast tomosynthesis methods have been developed, which acquire several projections of an object (the breast) at different angles and thereafter reconstruct the three-dimensional distribution of the detected grey values in a detector by means of a tomography reconstruction algorithm. With digital breast tomosynthesis it is possible to detect any lesion that might have been masked during the superimposition of the tissues that takes place during a classic mammography projection acquisition. In digital breast tomosynthesis the breast is imaged under compression. A sequence of projection views is acquired by the digital detector as the X-ray source is rotated to different angular positions about a fulcrum over a finite angular range. Anatomical structures or objects at different heights (or depths in the breast) are projected differently at different angles. The subsequent image reconstruction algorithm leads to a stack or a slab of slice images of the different depth layers parallel to the detector surface. This technique enables the physician during diagnosis to "browse through" the interior of the female breast without obstruction by surrounding superimposed tissue.

Further details and principles of digital breast tomosynthesis and respective apparatuses are disclosed in "Digital breast tomosynthesis using an amorphous selenium flat panel detector", M. Bissonnette et al., SPIE Vol. 5745, page 529 ff. For further information relating to reconstruction algorithms, particularly to filtered backprojection reconstruction algorithms it is referred to: "Optimizing filtered backprojection reconstruction for a breast tomosynthesis prototype device", T. Mertelmeier et al. in: SPIE 6142 (2006). The full content of these papers is incorporated here by reference.

A major drawback of tomosynthesis systems, however, is to be seen in that, typically, the digital volume contains 50 to 80 slices. Thus, the volume to be loaded, processed and stored is high.

One of the usual ways of reducing the amount of data for read and for storage in regular computer tomography is the reconstruction of the volume in thick slices. While the modern computertomographs are capable of producing images of less than 0.5 mm slice thickness (for example in thoracic or in abdominal images), radiologists often read and analyze three-dimensional images reconstructed as thick slices or thick slabs (for example 2 to 5 mm).

However, a major drawback of state of the art reconstruction methods is that the diagnostically relevant information may be easily overlooked during diagnosis, because the diagnostic relevant regions are not uniformly distributed throughout the volume. Some slices could be combined into 5 mm slabs without any loss of diagnostically relevant image features, while in other areas, where the probability of finding a lesion or an anatomical abnormality is high, a corresponding higher resolution is required for an accurate diagnosis. Thus, known conventional methods, which are based on reconstructing the volume in slabs with fixed thickness and with one single reconstruction algorithm for the whole volume, are not best suited. On the one hand, imaging the entire organ with very high resolution is not always possible, because of the storage space and reading time limitations. On the other hand, reconstructing only the relevant sub-volume with high resolution and not visualizing the surrounding areas of tissue at all does not provide enough diagnostic context.

Therefore, there is a need to provide a reconstruction method and system which considers non-uniformly distribution of lesions in the volume and reconstruction methods, considering these distribution differences and taking into account that different reconstruction algorithms may be applied to different anatomical structures (lesions) in the same volume to be examined. Moreover, there is a need for a reconstruction algorithm which processes slabs with variable slice thickness and with variable resolution within each of the slices.

SUMMARY OF THE INVENTION

An aspect of the invention is directed to overcoming the drawbacks of the systems of the prior art. The invention refers to reconstructing digital breast tomosynthesis volumes with variable slice thickness based on diagnostically relevant information density. It should be possible to apply different reconstruction algorithms for different regions or areas in the volume, depending on the distribution of diagnostically relevant information in the volume to be examined. Moreover, even the resolution within each slice could be different depending on the information density.

An embodiment of the invention refers to a method for image reconstruction of a three dimensional (3D) digital breast tomosynthesis volume (DBT) data in a plurality of slabs (each slab has a configurable thickness), comprising the steps of:

analyzing a volume in order to detect diagnostically relevant data by determining a type of lesion (like masses, calcifications etc.);

clustering the analyzed volume based on the determined lesion type in at least a first and a second region, wherein the first region has a high degree of diagnostically relevant data and the second region has a low degree of diagnostically relevant data;

determining a first reconstruction algorithm for the first region and a second reconstruction algorithm for the second region;

determining a first slab thickness for the first and a second slab thickness for the second region;

reconstructing the volume such that the first region is reconstructed with the first reconstruction algorithm (preferably with high resolution and in thin slabs) and the second region is reconstructed with the second reconstruction algorithm (preferably with low resolution and thick slabs).

Clusters are detected in the volume which relate to a lesion type. The (different) clusters are reconstructed differently (with different reconstruction algorithms), depending on their information density for diagnostic information content. The reconstruction algorithms differ in resolution and slab thickness.

In another aspect, the present invention refers to a control unit system for image reconstruction of a three-dimensional digital breast tomosynthesis volume in a plurality of slabs, having a pre-configurable thickness, wherein the control unit is adapted for executing the method mentioned above.

A further aspect refers to a computer program for executing the method mentioned above, when being implemented and running on the control unit system of a three-dimensional tomosynthesis scanner apparatus. The present invention is also directed to a computer program product, comprising code means adapted to execute the method steps according to the method, described above, when loaded into a computer processor.

Up to now the invention has been described with respect to the method. However, according to another aspect the invention is implemented in hardware or in hardware modules, which may be combined with software modules. The hardware modules are then adapted to perform the functionality of the steps of the method, described above. Accordingly, it is also possible to have a combination of hardware and software modules. The modules are preferably integrated into an existing medical environment, for example into an image acquisition device (CT, x-ray, tomosynthesis apparatus) or in a control unit of such an apparatus.

Preferably, the invention is implemented within an acquisition system (image acquisition, such as x-ray etc.). However, it has to be noted that the invention (hardware and/or software) may also be implemented within a diagnostic workstation. Then, diagnosis may be executed much more efficiently and the amount of data will be reduced (also in the context for archiving).

Another aspect of the invention is to be seen in a computer program being loadable in a memory of a computer, wherein the computer program is configured to carry out the steps of the method as mentioned above.

The invention may be better understood with reference to exemplary embodiments described in the following. The figures illustrate principles of the invention according to specific embodiments. It will be understood that it is also possible to implement the invention in other embodiments, so that these figures are only to be construed as examples. Moreover, in the figures, like reference numerals designate corresponding modules or elements throughout the different drawings.

BRIEF DESCRIPTION OF THE DRAWINGS

FIG. 3 is a flowchart of a reconstruction method according to a preferred embodiment of the present invention for reconstructing different volume regions differently.

DETAILED DESCRIPTION OF THE DRAWINGS AND PREFERRED EMBODIMENTS

Figure 1:
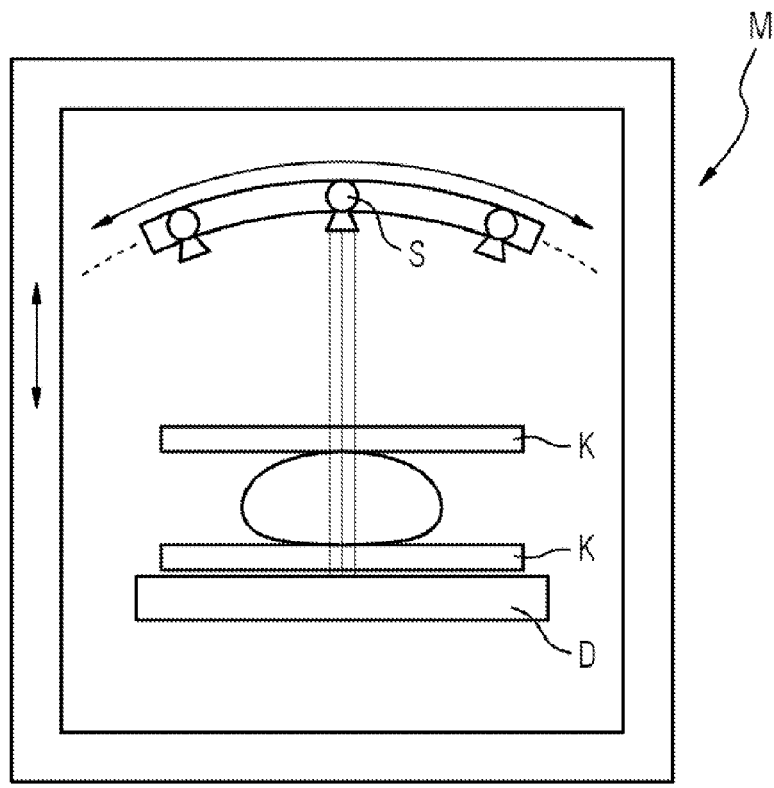
FIG. 1 is a schematic illustration of a medical tomosynthesis system according to an embodiment of present invention.

The present invention refers to an image reconstruction method for a three-dimensional digital breast tomosynthesis volume with a plurality of pre-configurable slabs. The method consists of three phases:

1. An Analysis Phase

The analysis phase is executed before reconstruction of the volume. After the volume to be reconstructed is generated or is provided (for example by means of a memory), the volume is analyzed in order to identify and detect diagnostically relevant data.

Further, in the analysis phase the analyzed volume is clustered in different regions, particularly in a first region and in a second region, wherein the first region has a high degree of diagnostically relevant data and wherein the second region has a low degree of diagnostically relevant data (and for example mainly consists of healthy tissue). It should be noted that it is possible to determine more than two different regions in the volume, which have (and consist of) different information and which are to be reconstructed differently (for instance with MIP or AIP techniques).

2. A Configuration Phase

The configuration phase relates to the determination of reconstruction relevant parameters for selecting an appropriate reconstruction algorithm, which best fits, the respective type of image information in that region. Particularly, a type of the region clusters is determined. More specifically, a type of information is determined which is present in the regions which a high degree of diagnostic relevant data. Further, the configuration phase refers to determining and configuring the reconstruction algorithms, wherein different reconstruction algorithms are determined for the first region and for the second region. Further, the slab thickness is configured for the reconstruction algorithm. Here again, the slab thickness may differ for the first and the second region.

3. A Reconstruction Phase

The reconstruction phase is adapted for executing the reconstruction algorithm according to the parameters, which have been determined and analyzed in the phases before (analysis phase, configuration phase). Particularly, the first region with a high degree of diagnostically relevant data is reconstructed with high resolution in thin slabs and the second region with low degree of diagnostically relevant data is reconstructed with low resolution and thicker slabs than the first region.

In the following, a short explanation and definition of terms, used within this disclosure is given.

The term "slab" refers to a stack or a sequence of slices in a tomosynthesis volume. A slab has a given thickness. A slab may be construed as consisting of an amount of slices. The slices may be computed with average or maximum intensity projection techniques. A slice may refer to a two-dimensional image plane of the three-dimensional volume stack. A slice typically has a thickness of 1 Voxel. A slab, usually, comprises a plurality of slices, wherein the amount of slices (and thus the thickness of the slab) is configurable. In this method thin slabs are distinguished from thick slabs. A typical slab thickness for the first region with high degree of diagnostically relevant information lies in the range of 0.5 mm to 2 mm and a typical second slab thickness for the second region with low information density of diagnostically relevant data is in the range of 2 mm to 10 mm. The terms "thin" and "thick" are to be construed such as a thin slab has lower height (extension in z-direction) than a thick slab. Preferably, a thick slab is at least twice as thick as a thin slice. The term "thin" and "thick" are to be construed according to general praxis in CT imaging where slices of 1 mm and lower are considered "thin" and slice with 5 mm as "thick". Thin slices provide the highest resolution in z-direction for a given image modality with reasonable x-ray dose and image quality. Thick slices combine retrospectively multiple thin slices for the sake of faster reading or higher signal to noise ratio. For further information relating to reconstruction in computer tomography and the terms used, it is referred to wikipedia, specifically the paragraph "image quality," accessible under the link: http://en.wikipedia.org/wiki/X-ray_computed_tomography, which is incorporated herein by reference.

"Analyzing" refers to identifying diagnostically relevant data in the volume. Particularly, healthy tissue has to be distinguished from non-healthy tissue. Thus, diagnostically relevant data refer to lesions, suspicious structures, anomaly structures, calcifications, clusters of calcifications, masses and scars.

A lesion is to be construed as a suspicious or anomaly structure that can be assigned a medical category like mass, cluster of calcifications or others. Lesions may be malign or benign.

Suspicious structures relate to areas in the breast where the tissue texture differs from the expectation and raises the suspicion that a tumor might be the cause for the changes.

Anomaly structures refer to areas in the breast where the tissue texture differs from the expectation, e.g. by comparing with the other breast or with prior examinations.

Calcifications within the breast are visible in x-ray as bright white spots or areas. Depending on their size and shape they indicate a presence of tumor or may be benign.

Clusters of calcifications refer to multiple calcifications. Depending on the size and shape the cluster indicates a presence of tumor or may be benign.

Scars relate to traces from prior breast surgery and reflect a change in breast tissue composition that is visible under x-ray.

Analyzing may be based on different procedures. Analyzing, particularly, refers to a type of volume date. A "type" may refer to a lesion and to different types of lesions (calcifications, masses, etc.). A type of information is determined with respect to diagnostic relevance. For instance, a first type may be "high diagnostic relevance" and a second type may be "low diagnostic relevance". The latter may for example refer to healthy tissue.

The term "clustering" refers to identifying at least two different sections in the volume. The sections differ in their diagnostic relevance. Thus, the term "clustering" may also be construed in the sense of classifying diagnostically relevant and non-relevant regions. Particularly, a first region with a high degree of diagnostic relevance and a second region with a low degree of diagnostic relevance are identified, which are to be reconstructed separately with different reconstruction algorithms. In other embodiments also more than two regions may be identified, for instance a first region with high diagnostic relevance, which is to be reconstructed with a first (e.g. high resolution) reconstruction algorithm a second region which is to be reconstructed with a second reconstruction algorithm and a third region with low diagnostic relevance, which is to be reconstructed with a third reconstruction algorithm (e.g. low resolution). A person skilled in the art will understand that the number of regions is not restricted. Also more than two regions may be clustered. Clustering is based on the analysis of information density in the respective volume. There are different embodiments for implementing the step of clustering. Clustering may be based on an anatomical model, on prior patient images and/or on computer aided detection algorithms. In a preferred embodiment all three options (implemented as algorithms) may be used in a combined manner. The regions or the clusters of high and low diagnostically relevant information density may refer to two-dimensional regions or three-dimensional regions in the volume.

According to the invention, different reconstruction algorithms may be applied. Particularly, different reconstruction algorithms are executed on the same volume. A first reconstruction algorithm is determined for a first region and a second reconstruction algorithm is determined for the second region (or vice versa).

The appropriate reconstruction algorithm is selected by optimizing the lesion-type specific image impression (e.g. MIP, AIP,), the image resolution (e.g. by iterative recon), the calculation time and effort (e.g. by FBP). The reconstruction algorithm is selected from the group consisting of:
filtered back-projection reconstruction (FBP)
average intensity projection
average projection techniques
maximum intensity projection algorithm
expectation-maximization algorithm
TV-minimization algorithm
any further reconstruction algorithms that may be available or may become available in the future.

"High resolution" preferably refers to full pixel resolution of typically below 100 micrometer whereas "low resolution" may be defined as combining pixel values and a resolution above 100 micrometer.

Preferred embodiments of the present invention are explained in more detail with respect to the accompanying figures.

FIG. 1 shows a schematic overview drawing of a mammographic apparatus for tomosynthesis, which in the figures is depicted with reference numeral M. As may be seen in FIG. 1, the apparatus M comprises X-ray sources S, which each generates an X-ray beam from the respective focus to a certain detector-pixel. The attenuation values for these rays through the object (preferably the breast) are calculated analytically and then may be further processed (for example averaged, processed by logarithmization and intensity-correction). These data serve as input data for reconstruction and are represented in the figures with reference numeral DBT-VOL. In an alternative architecture of the tomosynthesis apparatus M there is only provided one X-ray source, wherein its focal spot moves on a circular path around the pivoting point (isocenter), preferably in the plane perpendicular to the detector and intersecting the detector plane at a chest wall side. Independent of the respective embodiment, digital tomosynthesis is based on the fact that a plurality of two-dimensional images is generated, which differ in their angle around the object to be examined. The attenuation is measured in a detector D. Usually, the breast is compressed and positioned statically within two compression plates, which in FIG. 1 are depicted with reference numeral K. Preferably, the support of this mammography assembly is adjustable in height, which should be represented in FIG. 1 with the two-sided arrows.

With respect to FIG. 3, a typical workflow for a reconstruction method with variable slice thickness based on diagnostically relevant information density is explained below.

After starting the procedure in step 10, the three-dimensional digital breast volume and data are provided. It is possible to execute the reconstruction method online, i.e. during image acquisition. In this case, the three-dimensional volume data are generated by the mammography tomosynthesis apparatus M and are directly forwarded to the control unit for controlling the reconstruction algorithm. However, in another embodiment, it is also possible to execute the reconstruction method after all the image data have been acquired. In this case, the three-dimensional volume data are stored in a memory and are loaded and thus provided.

In step 12 the provided volume is analyzed in order to detect and identify diagnostically relevant data, like lesions, suspicious structures and/or clusters of calcifications etc. A type of the respective lesion is determined here. A "type" of the lesion may refer to:

Calcifications and clusters thereof
Masses
Scars etc.

In step 14 the analyzed volume is clustered. This means that the three-dimensional volume is classified in different types of clusters or classes. Preferably two clusters are differentiated: a first region or cluster and a second region or cluster. The first region may be defined as having a high degree of diagnostically relevant data (a high density referring to lesions) and wherein the second region has a low degree of diagnostically relevant data (and thus referring to healthy tissue). In other embodiments it is also possible to define more than two regions or clusters, which are going to be distinguished with respect to determining the reconstruction algorithm. With other words, reconstruction is region-specific and lesion-type specific. Thus a first lesion type is determined as a first cluster and reconstructed with a first reconstruction algorithm, whereas a second lesion type is determined as a second cluster and reconstructed with a second reconstruction algorithm.

Step 15 is optional and refers to a user interaction. Step 15 is not necessary, so that it is also possible to move from step 14 to step 16, in case a full automatic reconstruction algorithm determination is to be carried out. Otherwise, it is possible to show an intermediate result on a display comprising the detected diagnostically relevant structures (lesions, calcifications and others) and the detected and associated type of the respective lesion and its classification in a specific cluster. The user may confirm this setting by a user interaction signal (e.g. mouse click) or he may not accept this intermediate result. In the latter case, he may be provided with the possibility to amend the settings (e.g. to assign a specific lesion and/or region to another cluster and thus to another reconstruction process; this may be implemented by a simple drag-and-drop or selection operation on the user interface). Further, he may be provided with tools to amend the size of the respective cluster.

In step 16 a first reconstruction algorithm is determined for the first region and a second reconstruction algorithm is going to be determined for the second region or cluster, which has been identified in step 14. As mentioned before, different reconstruction algorithms are executed for the different clusters. For example a maximum intensity projection (MIP technique) could be applied to reconstruct slabs containing calcification clusters and an average intensity projection (AIP technique) may be used to reconstruct slabs through the masses. Moreover, a memory and computationally expensive iterative reconstruction could be used to reconstruct slabs corresponding to micro-calcifications and a less resource intensive ("cheaper") filtered back projection method could be used for the other slices.

This has the advantage that different reconstruction techniques may be applied for slices and/or for slabs of the same volume but corresponding to different types of lesions or different types of information density clusters. Thus, the theoretical advantage of digital breast tomosynthesis over conventional full-field digital mammography (FFDM) may also be transformed into an improvement of diagnostic relevance and diagnostic performance.

In step 18 a slab thickness for the respective region is determined within the same volume. This means that different slabbing methods for slices and slabs of the same volume are applied, which correspond to the respective different types of information density clusters, which have been identified in step 14.

In step 20 the identified and determined reconstruction algorithm is applied to the volume clusters according to the before mentioned method steps such that the first region is reconstructed with high resolution in thin slabs and the second region is reconstructed with low resolution and thicker slabs.

After step 20 has ended, in step 22 the reconstruction result is displayed on a monitor or on another user interface for the purpose of diagnosis. The reconstruction result is represented in the figures with reference numeral REC-VOL.

It has to be noted that some of the method steps mentioned above may be executed by accessing internal or external data sources, like data bases. The data bases may store meta data for processing the respective method step. For example it is possible that during the method step of clustering 14 an external data base R-DB is accessed, in which rules are stored for determining a table, storing specific DBT-volume image related data (preferably lesion-type data) and a corresponding respective reconstruction method. Thus, the reconstruction database R-DB is adapted to store knowledge with respect to determining a specific reconstruction algorithm for a specific type of lesions.

Figure 2:
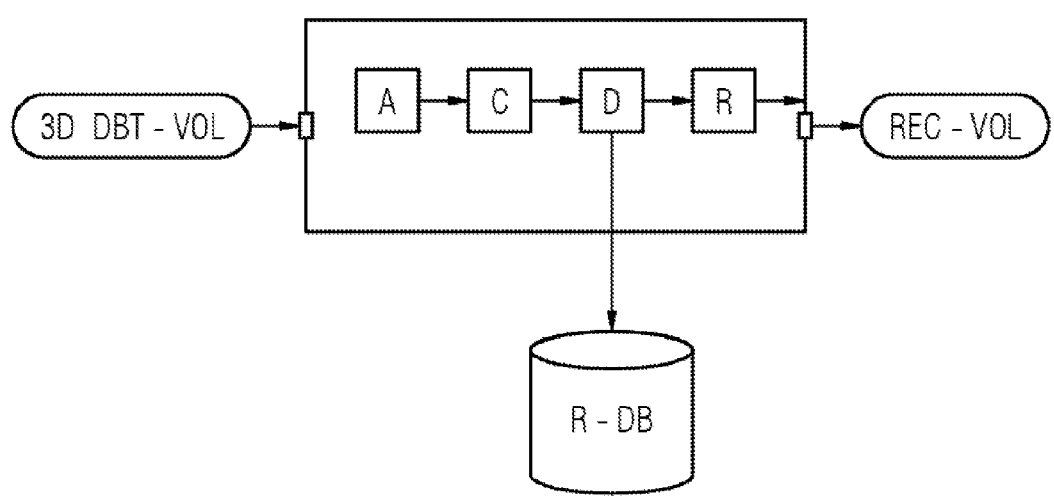
FIG. 2 is a block diagram of a reconstruction unit according to a preferred embodiment of the present invention.

An aspect of the present invention is to be seen in a system and in a control unit for an image acquisition apparatus M in order to execute the reconstruction method which has been described above. FIG. 2 shows a schematic block diagram of the system. The three-dimensional digital breast tomosynthesis data DBT-VOL serve as input data and a reconstructed volume REC-VOL is the output. The system comprises an analyzer A, a cluster unit C, a determination unit D and a reconstruction unit R. At least the determination unit D or any other unit may access an external database, such as the reconstruction database R-DB, which is also depicted in FIG. 2 as an example. For a person skilled in the art it is also possible that the other units of the system may also access internal or external further sources and memories. The analyzer is adapted to analyze the provided three-dimensional DBT-volume in order to detect diagnostically relevant data, like anomaly structures, suspicious structures, lesions etc. The clustering unit C is adapted for classifying the analyzed volume in at least a first and a second region (which may also be construed as sub-volume or sub-image) within the same volume to be reconstructed. The first and the second region have different information density with respect to those anatomical structures which are relevant for diagnosis.

The determination unit D is adapted for selecting or determining different reconstruction algorithms for the volume clusters, which have been identified by the clustering unit C. Further, the determination unit D is adapted for defining a slab thickness for the respective cluster or region, which has been identified by the clustering unit C. With the determination unit D it is possible to use different reconstruction algorithms and different slabbing methods for the different volume clusters, which have been identified by the clustering unit C. It is possible to apply different reconstruction algorithms and slabbing methods for slices within the slabs and for slabs within the volume, corresponding to the specific type of information density of the respective cluster.

The reconstruction unit R is adapted for reconstructing the volume according to the determined parameters, as mentioned above, preferably according to the specific slab thickness for the first and for the second cluster and by means of the determined reconstruction algorithm for the first and second cluster, respectively.

In another embodiment the clustering unit C also accesses external sources or databases in order to identify the clusters with high and low information density with respect to diagnostically relevant data. For example it is possible that the clustering unit C accesses anatomical models, which may be stored in a model store. For example, in a digital breast tomosynthesis volume the top and bottom slices representing the skin could be compressed into relatively thick slabs without any loss of diagnostically relevant information. Accordingly, they have low diagnostically relevant information density.

Another embodiment refers to accessing prior patient images from the same and/or from a different imaging modality. These prior patient images may be stored in an image storage. For example, in digital breast tomosynthesis, the areas around surgically removed lesions or suspicious areas identified on prior breast images could be visualized with high resolution slices.

In a further embodiment automated abnormality detection algorithms may be used. For example a computer aided detection algorithm (CAD algorithm) could be used to identify potentially diagnostically relevant areas or sub-volumes. Some types of abnormalities would require a high resolution reconstruction and, on the other hand, some other types require a thick-slab reconstruction with a particular thickness centered in the lesion for optimal visualization. For instance an entire calcification cluster could be represented in one single slab. The CAD algorithm with a very high sensitivity for calcification cluster detection is used here. Specificity should be at an acceptable level but not necessarily very high. The CAD algorithm outputs the center and the extent of the calcification cluster, if the extent of the calcification cluster is too large to be represented in one slab. In case of masses it is important that the slab passing through or intersecting the respective mass captures its largest extent.

According to a preferred embodiment of present invention, not only the resolution for the different clusters may be different, but also the resolution within each slice of a slab or cluster could be different depending on the respective information density.

According to a preferred embodiment, the three-dimensional digital input data DBT-VOL and the result REC-VOL, i.e. the reconstructed volume, is formatted according to the DICOM standard.

In another embodiment the control unit for controlling reconstruction may be implemented in a viewing work station, too. In case the reconstruction method according to the present invention is executed, the displayed slice thickness and/or resolution changes, depending on the position in the volume and thus depending on the information density with respect to diagnostic relevant data.

With other words, the present invention refers to a reconstruction method, in which different cluster-specific reconstruction techniques are executed for reconstruction of one common volume. The appropriate reconstruction algorithm is defined or selected by optimizing the lesion-type specific image impression (e.g. MIP, AIP etc.), the image resolution (e.g. by iterative reconstruction) and the calculation time and the calculation effort (e.g. by filtered back projection).

Moreover, it is also possible to provide a central storage or repository for storing the input data DBT-VOL and the output date, the reconstructed images REC-VOL.

The example embodiments are to be considered in all respects only as illustrative and not restrictive. The scope of the invention is, therefore, indicated by the appended claims rather than by this description. All changes which come within the meaning and range of equivalency of the claims are to be embraced within their scope.

The invention claimed is:

1. A method for image reconstruction of a three-dimensional (3D) digital breast tomosynthesis volume (DBT) in a plurality of slabs, the method comprising the following steps:
    analyzing a volume in order to detect diagnostically relevant data by determining a type of lesion;
    clustering the analyzed volume based on the determined type of information in at least a first region and a second region, the first region having a high degree of diagnostically relevant data and the second region having a low degree of diagnostically relevant data;
    determining a first reconstruction algorithm for the first region and a second reconstruction algorithm for the second region;
    determining a first slab thickness for the first region and a second slab thickness for the second region; and
    reconstructing the volume such that the first region is reconstructed with the first reconstruction algorithm with a high resolution in thin slabs and the second region is reconstructed with the second reconstruction algorithm with a low resolution and thick slabs.

2. The method according to claim 1, wherein the first and second reconstruction algorithms are different algorithms.

3. The method according to claim 1, wherein a first resolution is determined and applied to the first region and a second resolution, different from the first resolution, is determined and applied to the second region.

4. The method according to claim 3, which comprises determining the resolution specifically for each slab.

5. The method according to claim 1, wherein the clustering step comprises executing an algorithm selected from the group consisting of:
    an anatomical model based algorithm;
    a prior patient image based algorithm; and
    a computer-aided detection algorithm.

6. The method according to claim 1, which comprises determining the reconstruction algorithm specifically for the first and second regions based on a type of lesion and selecting the reconstruction algorithm from the group consisting of:
    maximum intensity projection (MIP);
    average intensity projection (AIP);
    iterative reconstruction; and
    filtered backprojection.

7. A control unit system for image reconstruction of a 3D digital breast tomosynthesis volume (DBT) in a plurality of slabs having a thickness, the system comprising a control unit configured for executing the method according to claim 1.

8. A computer program for image reconstruction of a 3D digital breast tomosynthesis volume (DBT) in a plurality of slabs, the computer program stored in a non-transitory computer-readable medium and configured to execute, when the program is loaded into and executed by a processor of a control unit integrated in a 3D tomosynthesis scanner apparatus or in a diagnostic workstation, a method comprising the steps of:
    analyzing a volume in order to detect diagnostically relevant data by determining a type of lesion;

clustering the analyzed volume based on the determined type of information in at least a first region and a second region, the first region having a high degree of diagnostically relevant data and the second region having a low degree of diagnostically relevant data;

determining a first reconstruction algorithm for the first region and a second reconstruction algorithm for the second region;

determining a first slab thickness for the first region and a second slab thickness for the second region; and reconstructing the volume such that the first region is reconstructed with the first reconstruction algorithm with a high resolution in thin slabs and the second region is reconstructed with the second reconstruction algorithm with a low resolution and thick slabs.

* * * * *